(12) United States Patent
Capellmann et al.

(10) Patent No.: US 9,914,433 B2
(45) Date of Patent: Mar. 13, 2018

(54) OVAL DEFROST OUTLET COMBINED WITH COLD AIR BYPASS CHANNEL

(71) Applicant: Halla Visteon Climate Control Corp., Daejeon (KR)

(72) Inventors: Christoph Capellmann, Würselen (DE); Detlef Handwerk, Köln (DE); Johannes Stausberg, Köln (DE); Evzi Duka, Köln (DE); Michael Fietz, Aachen (DE)

(73) Assignee: HANON SYSTEMS, Daejeon-si (KR)

( * ) Notice: Subject to any disclaimer, the term of this patent is extended or adjusted under 35 U.S.C. 154(b) by 286 days.

(21) Appl. No.: 14/723,521

(22) Filed: May 28, 2015

(65) Prior Publication Data
US 2015/0343995 A1 Dec. 3, 2015

(51) Int. Cl.
| | |
|---|---|
| *B60H 1/34* | (2006.01) |
| *B60S 1/02* | (2006.01) |
| *B60S 1/54* | (2006.01) |
| *B60H 1/24* | (2006.01) |
| *B60H 1/00* | (2006.01) |

(52) U.S. Cl.
CPC .......... *B60S 1/023* (2013.01); *B60H 1/00042* (2013.01); *B60H 1/242* (2013.01); *B60H 1/34* (2013.01); *B60S 1/54* (2013.01); *B60H 2001/00092* (2013.01); *B60H 2001/00135* (2013.01); *B60H 2001/00164* (2013.01)

(58) Field of Classification Search
CPC ........ B60S 1/023; B60S 1/54; B60H 1/00042; B60H 1/242; B60H 1/34; B60H 2001/00092; B60H 2001/00135; B60H 2001/00164

USPC .......................................................... 454/127
See application file for complete search history.

(56) References Cited

U.S. PATENT DOCUMENTS

| | | | | |
|---|---|---|---|---|
| 3,832,939 | A * | 9/1974 | Kakei ...................... | B60S 1/54 239/284.1 |
| 8,376,819 | B2 * | 2/2013 | Vincent ............. | B60H 1/00028 165/42 |
| 2007/0017655 | A1 * | 1/2007 | Mouri .................. | B60H 1/0005 165/42 |

(Continued)

FOREIGN PATENT DOCUMENTS

| | | |
|---|---|---|
| DE | 10127339 A1 | 12/2002 |
| JP | 2010070173 A | 4/2010 |

(Continued)

*Primary Examiner* — Gregory Huson
*Assistant Examiner* — Dana Tighe
(74) *Attorney, Agent, or Firm* — James D. Miller; Shumaker, Loop & Kendrick, LLP

(57) ABSTRACT

A housing including at least one flow path in fluid communication with a mixing chamber, a windshield air outlet, a windshield air flap, a dashboard air outlet, and a dashboard air flap. A bypass is in fluid communication with the dashboard outlet and configured to conduct a cool air flow around the at least one flow path and the mixing chamber. A flow conduit extends from the mixing chamber to the windshield air outlet. The flow conduit is constructed as one part and comprises a wall enclosing a circumference thereof. The flow conduit extends through the bypass, wherein the warm air flow is separated from a warm air flow through the flow conduit by the wall of the flow conduit. The bypass is formed in a bipartite manner around the flow conduit.

9 Claims, 5 Drawing Sheets

(56) References Cited

U.S. PATENT DOCUMENTS

| | | | | |
|---|---|---|---|---|
| 2009/0117841 A1* | 5/2009 | Goto | ................. | B60H 1/00064 |
| | | | | 454/127 |
| 2011/0117829 A1* | 5/2011 | Ikeda | ................. | B60H 1/00064 |
| | | | | 454/155 |
| 2012/0252342 A1* | 10/2012 | Stang | ................. | B60H 1/0005 |
| | | | | 454/126 |

FOREIGN PATENT DOCUMENTS

| JP | 2011106179 A | 6/2011 |
|---|---|---|
| KR | 20130100692 A | 9/2013 |

\* cited by examiner

OVAL DEFROST OUTLET COMBINED WITH COLD AIR BYPASS CHANNEL

CROSS-REFERENCE TO RELATED APPLICATIONS

This application claims priority to German Provisional Patent Application Serial No. DE 10 2014 107 566.8 filed on May 28, 2014 and German Non-Provisional Patent Application Serial No. DE 10 2015 107 658.6 filed May 15, 2015, hereby incorporated herein by reference in their entirety.

FIELD OF THE INVENTION

The invention relates to an arrangement for the distribution of air for an air conditioning system of a motor vehicle. More particularly, the invention relates to an arrangement of a housing for an air conditioning system of a motor vehicle.

BACKGROUND

An optimization regarding the structural volume is required in motor vehicles on account of the increasing number of technological components in order to be able to ensure the desired plurality of functions provided by the components. For this reason, large-volume components for air conditioning, known from stationary air conditioning systems in the form of mixing chambers, flow guidance devices, and vortexing devices, cannot be used in motor vehicles on account of the low space conditions.

An additional requirement placed on an air conditioning system of a motor vehicle, which conditions a supplied flow of an air mass, optionally divides it and conducts the individual air mass flows to different areas of the vehicle, consists in loading different air outlets of the air conditioning system according to their position and their function with differently tempered air mass flows. The supplied air mass flow is conducted via the heat exchangers so that the air cools down and is dehumidified, as well as, if necessary, reheated before it is conducted into the passenger compartment. The air is blown in, for example, into the area as well as via openings in the dashboard into the passenger compartment and in addition conducted via outlets directly on the windshield in order to keep it free of condensation or to defrost it.

In generic air conditioning systems regulated on the air side, the air mass flow to be supplied to the passenger compartment is divided into two partial air flows by at least one flap, also designated as a temperature flap. The required temperatures of the air mass flows are adjusted with the aid of the temperature flaps and different regulating mechanisms. A warm air flow is conducted through a hot heat exchanger and heated. At the same time a cool air flow flows around the hot heat exchanger. Both differently tempered partial air flows are subsequently mixed in order to achieve the required target temperature.

In addition, it can be necessary in the air conditioning system of a motor vehicle to branch off a bypass air flow of cooled down and dehumidified, that is, cold, air in the direction of flow of the air to be conditioned after the heat exchanger operated as an evaporator, and to conduct it past the mixing chamber directly to the air outlets, in particular to the air outlets in the dashboard. The bypass air flow of the cold air mass flows through a cold air bypass as another additional flow path in order to cool down in a defined manner with the cold air the blowing-out temperature at the air outlets in the dashboard. This achieves a greater stratification of temperature in the passenger compartment, in particular between the air outlets in the dashboard and in the foot area. The temperatures of the air flows at the different outlets, such as the foot area, the dashboard and the pane ventilation, wherein temperatures deviate from each other, are designated as temperature stratification.

In a construction of the cold air bypass above, the mixing chamber of the air conditioning the cold air bypass should be arranged around the flow paths to the air outlets of the windshield. In order to distribute the cold air uniformly onto the air outlets in the dashboard, the air outlet to the windshield is constructed in two parts, a left and a right outlet, in traditional air conditioning systems. The cold air can be conducted to the two air outlets to the windshield as well as around the two flow conduits running to the air outlets to the windshield in order to make possible a good distribution of the cold air onto the air outlets in the dashboard. The systems known in the prior art have very expensive additional apparatus elements, such as the second air outlet to the windshield and the associated air flaps, as well as components for connection within the system, all of which require more space, expense and also an additional assembly expense, as well as a corresponding maintenance expense. The additional air flaps, as well as their associated drive technology also require an additional expense of the constructively very expensive control means of the air mass flows. Furthermore, the additional installations cause limitations and constrictions of the flow conduits and bring about elevated pressure losses in the air mass flow, which results in an elevated performance requirement, an elevated consumption of energy and a reduction of the efficiency of the air conditioning system, and therefore, of the entire motor vehicle. In addition, the additional installations along with the distinct flow losses also cause great flow noises.

Accordingly, there is a need in the art for an air conditioning system of a motor vehicle available which has a simple construction with a minimal number of required components in order to reduce the space requirement of the system, and to reduce the expenses of manufacture, the material cost, the assembly cost and the maintenance cost. In addition, the pressure losses of the air flows through the system, as well as the energy consumption of the system, are to be minimized while the air performance and the efficiency of the air conditioning system are to be increased. Moreover, the occurring flow noises are to be reduced.

SUMMARY OF THE INVENTION

The need in the art is addressed by the subject matter with the features of the independent claim. Further developments are indicated in the dependent claims.

The need in the art is addressed by an arrangement in accordance with the invention for the distribution of air for an air conditioning system of a motor vehicle. The air conditioning system is constructed with means for transporting, cooling, and heating air, and with a housing.

The housing comprises at least one flow path which is constructed to empty into a mixing chamber. The housing further including a windshield air outlet and at least one dashboard air outlet, as well as associated air flaps. In addition, the housing comprises a cold air bypass around the flow path constructed to empty into a mixing chamber of the housing. The mixing chamber is in fluid communication with the dashboard air outlet. The housing also comprises a flow conduit extending from the mixing chamber to the windshield air outlet. The flow conduit constructed with a circumferentially closed wall is arranged in such a manner extending through the cold air bypass that the partial air flows conducted through the flow path and the flow conduit are separated from one another by the flow conduit wall.

According to the concept of the invention, the flow conduit is constructed in one part and the cold air bypass is bipartite, wherein the cold air bypass is divided into at least two parts around the flow conduit.

According to an embodiment of the invention, the flow conduit wall has an oval cross section, in particular an elliptical cross section. According to an alternative embodiment, the flow conduit can also be constructed with a circular cross section.

The indication of the construction of the cross section refers to the cross section with respect to the direction of flow of the air from the mixing chamber to the windshield air outlet, and therefore to the cross-sectional area of the partial air flow conducted from the mixing chamber to the windshield air outlet. In the case of a substantially constant wall thickness flow conduit also has an oval, in particular an elliptical or circular shape on the outside.

According to a further development of the invention, the windshield air outlet is constructed in one part. The one-part windshield air outlet is preferably to be opened and closed with an individual and single air flap driven with only a single drive.

According to an advantageous embodiment of the invention, air conduction elements are constructed inside the cold air bypass for the purposeful conducting of a bypass air flow around the wall of the flow conduit. The bypass air flow is uniformly distributed with the construction of the air conduction elements over the cross-sectional area of the cold air bypass in the direction of flow of the air through the flow conduit.

The air conduction elements are typically arranged at a distance from the wall of the flow conduit in such a manner that a first part of the bypass air flow conducted through the cold air bypass flows between the wall of the flow conduit and an air conduction element and a second part of the bypass air flow conducted through the cold air bypass flows between an air conduction element and the housing.

Another advantageous embodiment of the invention consists in that the bypass is constructed limited by an outer side of the flow conduit wall and an inner side of the housing wall. Here, the housing comprises at least one closure element in the area of the flow path for closing an opening formed in the housing wall.

The closing element is typically connected to the housing by screws and/or clipping. Alternatively, the closure element can be integrated in a holding device of the kinematics of the air flaps of the air conditioning system.

According to a further development of the invention, the air conduction element is arranged integrated on the closure element so that the air conduction element and the closure element are formed in one piece. During the closing procedure of an opening present in the area of the cold air bypass inside the housing, the air conduction element is simultaneously introduced into the cold air bypass. The shape of the air conduction element can be varied as desired and adapted to the cross section of flow of the cold air bypass without changing the housing.

According to another embodiment of the invention, the housing is constructed with at least one warm air path and a cool air path that empty into the mixing chamber. A warm air flow conducted through the first flow path has a first temperature and a cool air flow conducted through the second flow path has a second temperature.

The housing is advantageously constructed with at least one air outlet to a foot area and at least one associated air flap. In addition, the mixing chamber is advantageously connected with flow technology to the windshield air outlet, the foot-area air outlet, and the dashboard air outlet.

According to another advantageous embodiment of the invention, an air flap and temperature flaps are constructed inside the housing. The air mass flow delivered into the housing can be divided by the air flap associated with the cold air bypass and by the temperature flaps into at least one of the bypass air flow, the warm air flow, and the cool air flow.

In sum, the arrangement of the invention for the distribution of air for an air conditioning system of a motor vehicle has various advantages.

A first advantage provides a uniform division of the bypass air flow conducted through the cold air bypass, in particular for cold air, over the entire cross section of flow and therefore onto the air outlets in the dashboard.

Another advantage of the disclosure is an optimal rheological shape of the flow conduit, in particular for an outer flow of the bypass air flow to the air outlets in the dashboard and for an inner flowthrough of a partial mass flow to the air outlet of the windshield.

A further advantage of the disclosure includes one-part construction of the flow conduit, which makes possible the one-part construction of the air outlet to the windshield with an air flap and to the one associated drive, and reduction of the increased expense regarding material, without disadvantages for the air performance.

Additionally, the instant disclosure provides simple construction with a minimal number of components.

Yet another advantage of the instant disclosure is a minimization of the development of noise and pressure losses with a steady or improved air performance, resulting in an increase of the efficiency of the air conditioning system.

Further, the instant disclosure allows for minimization of a space requirement of the air conditioning system and minimization of manufacturing and maintenance costs by minimizing time and materials required.

BRIEF DESCRIPTION OF THE DRAWINGS

Other details, features and advantages of embodiments of the invention result from the following description of exemplary embodiments with reference made to the drawings. The drawings show an air conditioning system of a motor vehicle.

DETAILED DESCRIPTION OF THE INVENTION

Figure 1:
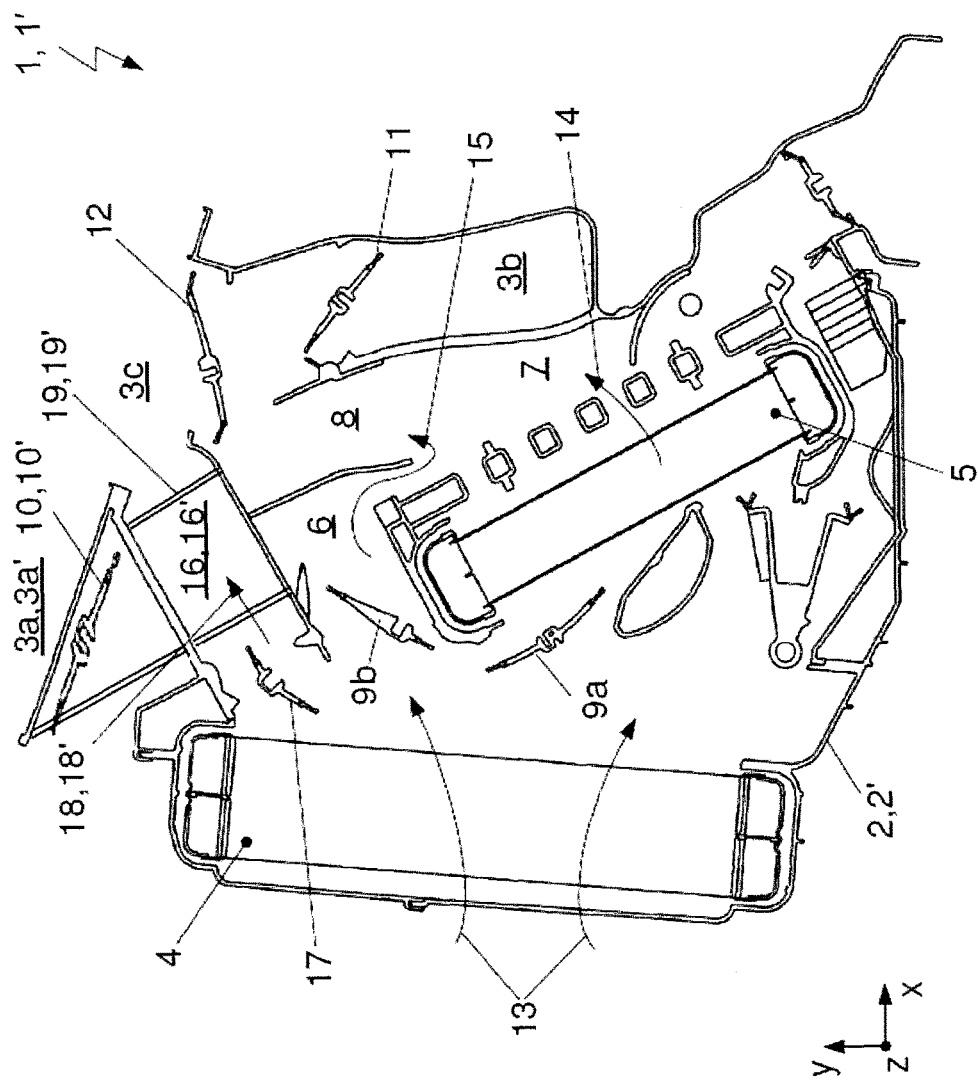
FIG. 1 shows air outlets and associated air flaps and a cold air bypass in a sectional side view.

FIG. 1 shows a sectional view of an air conditioning system 1, 1' of a motor vehicle. The air conditioning system 1, 1' includes a housing 2, 2' having a windshield air outlet 3a, 3a', a foot-area air outlet 3b, a dashboard air outlet 3c, a windshield air flap 10, 10', a foot-area air flap 11, a dashboard air flap 12, and a cold air bypass 16, 16'.

The air conditioning system 1, 1' further comprises a fan (not shown) for drawing in and transporting air in the direction of flow 13 through the housing 2, 2' of the air conditioning system 1, 1' with an evaporator 4 and a heater core 5. The housing 2, 2' comprises a mixing chamber 8 in addition to the three air outlets 3a, 3a', 3b, 3c.

The air mass flow drawn in by the fan and conducted in the direction of flow 13 to the evaporator 4 is guided completely or proportionally through the heat exchanger surface of the evaporator 4 and subsequently distributed onto a cold air path 6, a warm air path 7, and the cold air bypass 16, 16'. The air mass flow can be conducted at least proportionally through a bypass (not shown) around the evaporator 4.

A cool air flow conducted through the warm air path 7 is conducted completely through the heat exchanger surface of the hot heat exchanger 5 and heated. The cold air path 6 conducts the air cooled off and/or dehumidified in the evaporator 4 as a warm air flow around the hot heat exchanger 5. Here, the cold air path 6 is arranged in vertical direction y of the air conditioning system 1, 1' above the hot heat exchanger 5, which is constructed inside the warm air path 7.

The cold air path 6 and the warm air path 7 empty into the mixing chamber 8. The cool air flow and the warm air flow distributed onto the flow paths 6, 7 are brought back together in the mixing chamber 8 and mixed before the now conditioned air is supplied through the individual air outlets 3a, 3a', 3b, 3c to the passenger compartment.

The cold air bypass 16, 16' makes possible the flow of cold air cooled off and/or dehumidified in the evaporator 4 as a bypass air flow around the hot heat exchanger 5 and the cold air path 6, directly to the dashboard air outlet 3c. The bypass air flow of cold air is controlled by a bypass air flap 17 arranged on the cold air bypass 16, 16'.

The air mass flow conducted through the evaporator 4 is distributed by the bypass air flap 17, a cold-air temperature flap 9b, and a warm-air temperature flap 9a into the bypass air flows through the cold air bypass 16, 16', the cold air path 6, and the warm air path 7. The air flows through the flow paths 6, 7, 16, 16', that is, the amounts of the total air mass flow conducted through the air conditioning system 1, 1' and therefore the temperature at the air outlets 3a, 3a', 3b, 3c can be controlled by the position of the temperature flaps 9a, 9b and of the bypass air flap 17. The cold-air temperature flap 9b serves to open and close the cold air path 6, whereas the warm-air temperature flap 9a is provided for opening and closing the warm air path 7.

The windshield air outlet 3a, 3a', the foot-area air outlet 3b, and the dashboard air outlet 3c can be opened and closed by the air flaps 10, 10', 11, 12. The air outlet 3c is also designated as the passenger or driver blower since the air mass flow conducted through the air outlet 3c can blow directly on the passengers. The temperature flaps 9a, 9b and air flaps 10, 10', 11, 12, 17, are constructed flat and have a cross-section that results from the plane stretching in the horizontal direction x and the vertical direction y. The temperature flaps 9a, 9b and air flaps 10, 10', 11, 12, 17 are rotatably supported about an axis of rotation that extends in the direction z.

In the arrangement shown in FIG. 1, with at least partially open temperature flaps 9a, 9b and the open bypass air flap 17, the air mass flow is distributed onto each of the flow paths 6, 7, 16, 16'. The cool air flow conducted in direction of flow 15 through the cold air path 6 and the warm air flow conducted in the direction of flow 14 through the warm air path 7 are mixed in the mixing chamber 8. Subsequently, the mixed air mass flow can be conducted through the air outlets 3a, 3a', 3b, 3c into the passenger compartment. The bypass air flow conducted through the windshield air outlet 3a, 3a' is conducted around a flow conduit 19, 19' through the cold air bypass 16, 16'.

The bypass air flow conducted in the direction of flow 18, 18' through the cold air bypass 16, 16' is conducted around the flow paths 6, 7 and the mixing chamber 8, directly to the dashboard air outlet 3c into the passenger compartment. The bypass air flow conducted through the cold air bypass 16, 16' flows on the outside around the flow conduit 19, 19' without mixing with a windshield air flow passing through the flow conduit 19, 19'.

The cold air that is cooled off and/or dehumidified while flowing over the heat exchange surface of the evaporator 4 can therefore be conducted as the cool air flow in the direction of flow 15 through the cold air path 6 and subsequently through the flow conduit 19, 19' to the windshield air outlet 3a, 3a' as well as the bypass air flow in the direction of flow 18, 18' to the cold air bypass 16, 16' around the flow conduit 19, 19' to the dashboard air outlet 3c.

The cold air cooled off in the evaporator 4 and flowing directly through the cold air bypass 16, 16' to the dashboard air outlet 3c is utilized to reduce the air temperature in the area of the dashboard air outlet 3c, which results in an elevation of the temperature difference and the shaping of the temperature stratification between the dashboard air outlet 3c and in particular the foot-area air outlet 3b.

Figure 2A:
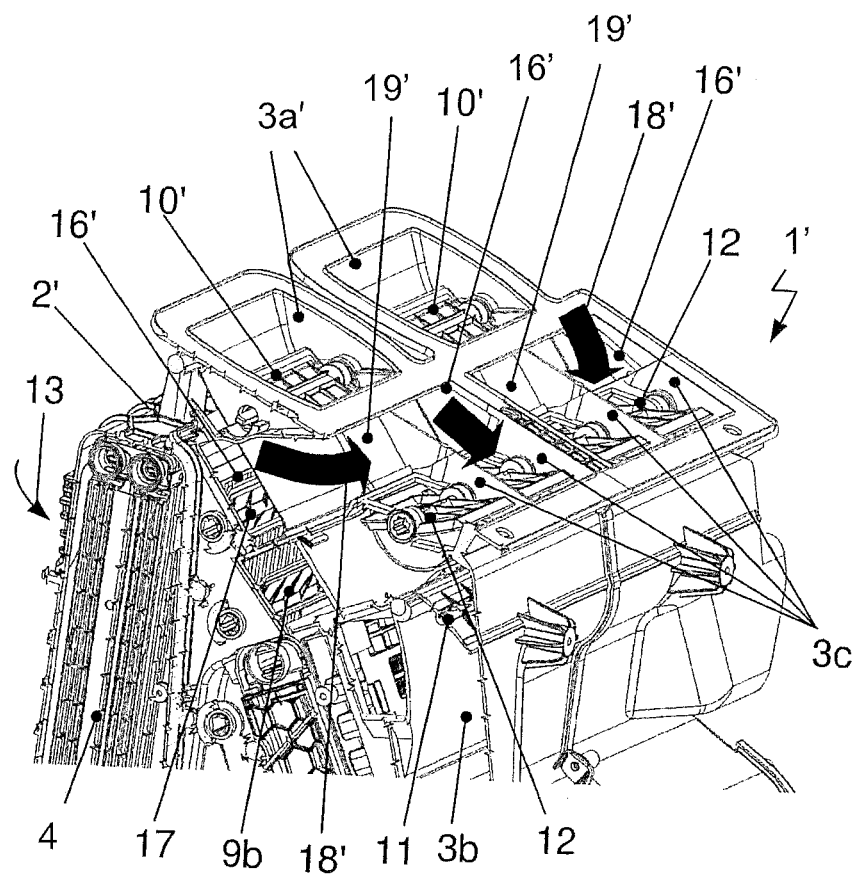
FIG. 2a shows a bipartite air outlet to the windshield in a fragmentary perspective view from the prior art.
Figure 2B:
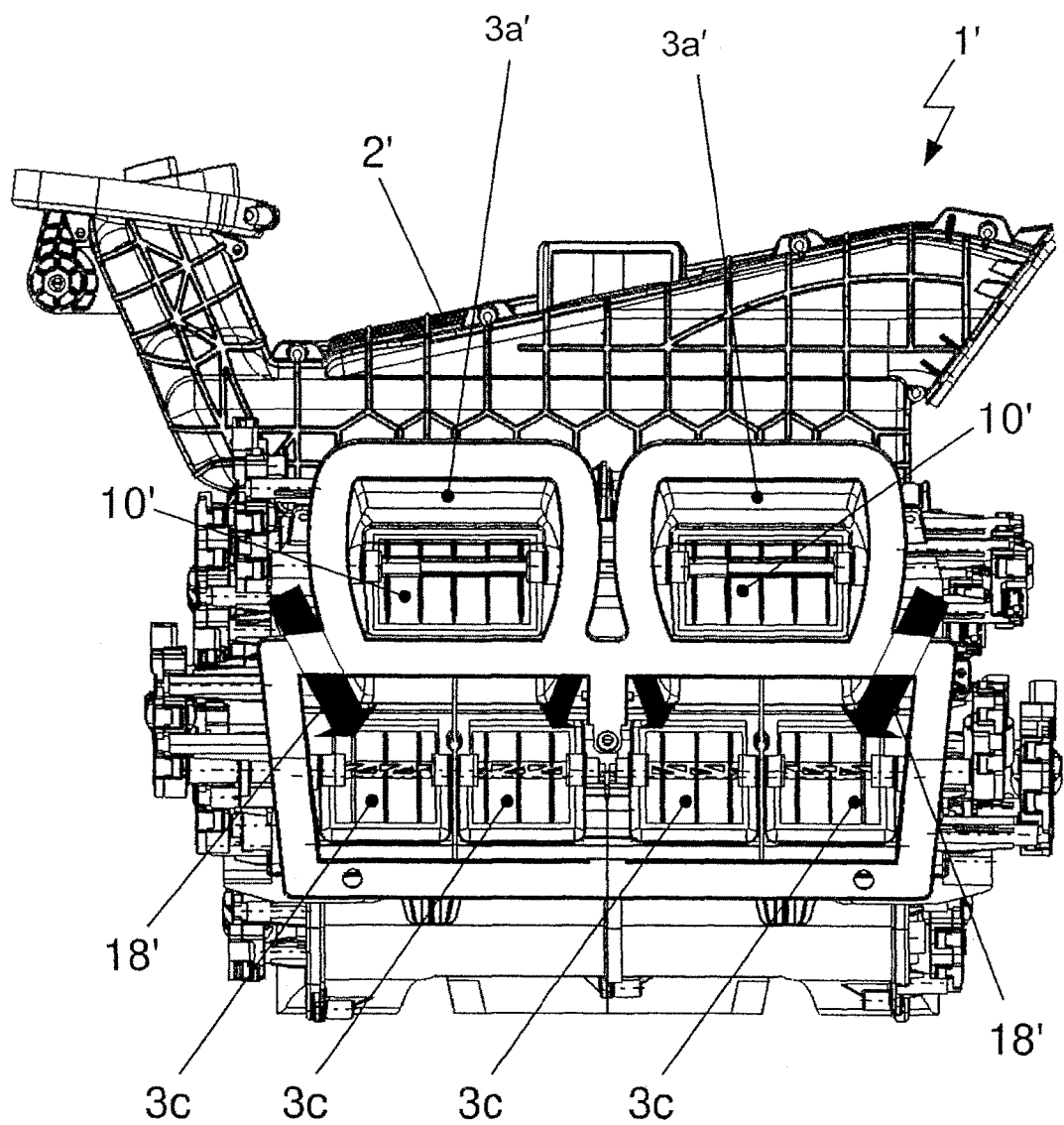
FIG. 2b shows a bipartite air outlet to the windshield in a top view from the prior art.

FIGS. 2a and 2b show an air conditioning system 1' of motor vehicle with a bipartite windshield air outlet 3a' according to FIG. 2a in a perspective view and according to FIG. 2b in a top view, both from the prior art.

The bypass air flow of cooled-off and dehumidified, that is, cold air that is branched off in the direction of flow 13, 18' of the air to be conditioned after the evaporator 4 is conducted in the direction of flow 18' past the mixing chamber 8 on the one hand and the flow conduits 19' and therefore the air outlets 3a' to the windshield, and on the other hand directly to the air outlets 3c in the dashboard. The bypass air flow of the cold air flows here through the cold air bypass 16' that can be opened and closed with the bypass air flap 17 in order to cool off in a defined manner with the cold air the blowing out temperature at the air outlet 3c in the dashboard.

In the construction of the cold air bypass 16' in the vertical direction y above the mixing chamber 8 of the air conditioning system 1' the cold air bypass 16' is constructed around the flow conduits 19' to the air outlets 3a' of the windshield. In order to distribute the cold air uniformly onto the air outlets 3c in the dashboard, in traditional air conditioning systems 1', the air outlet 3a' to the windshield is constructed in a bipartite manner in a left and a right outlet. The cold air is conducted around the two flow conduits 19' in order to make possible a good distribution of the cold air onto the dashboard air outlets 3c.

First portions of the bypass air flow of cold air flowing through the cold air bypass 16' consequently flow on the outside around the flow conduits 19' extending from the mixing chamber 8 to the windshield air outlets 3a' while second portions of the bypass air flow flowing through the cold air bypass 16' flow between the flow conduits 19' arranged at a distance from one another. The bypass air flow of cold air flowing through the cold air bypass 16' is uniformly distributed onto the dashboard air outlets 3c.

The two flow conduits 19' running to the windshield air outlets 3a' have substantially rectangular cross sections of flow. A slot formed between the two flow conduits 19' arranged at a distance from one another serves as an area of the cold air bypass 16'. The flow of cold air around of the two flow conduits 19' that are rectangular and therefore with edges causes undesired flow noises and pressure losses.

The flow conduits 19' each have a windshield air flap 10' in the vicinity of the windshield air outlets 3a' for opening and closing the windshield air outlets 3a', which are to be operated by a common drive or separate drives. Due to the construction of at least two flow conduits 19', the air conditioning system 1' has a large space requirement and an elevated number of components for controlling the windshield air outlets 3a' which, for its part, necessitates a high expense for the construction, assembly, and maintenance and therefore also the costs.

Figure 3:
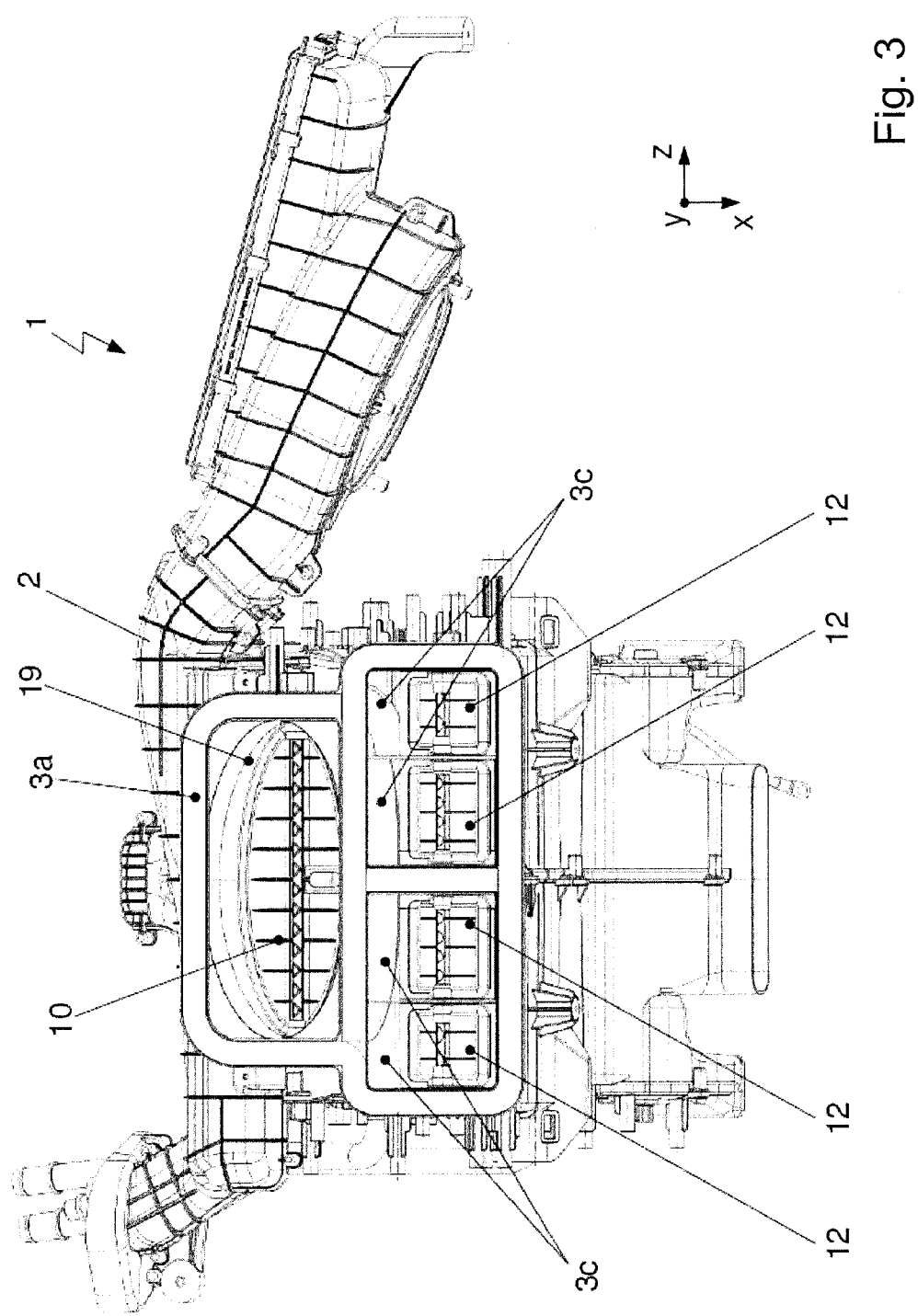
FIG. 3 shows a one-part air outlet to the windshield in a top view.
Figure 4:
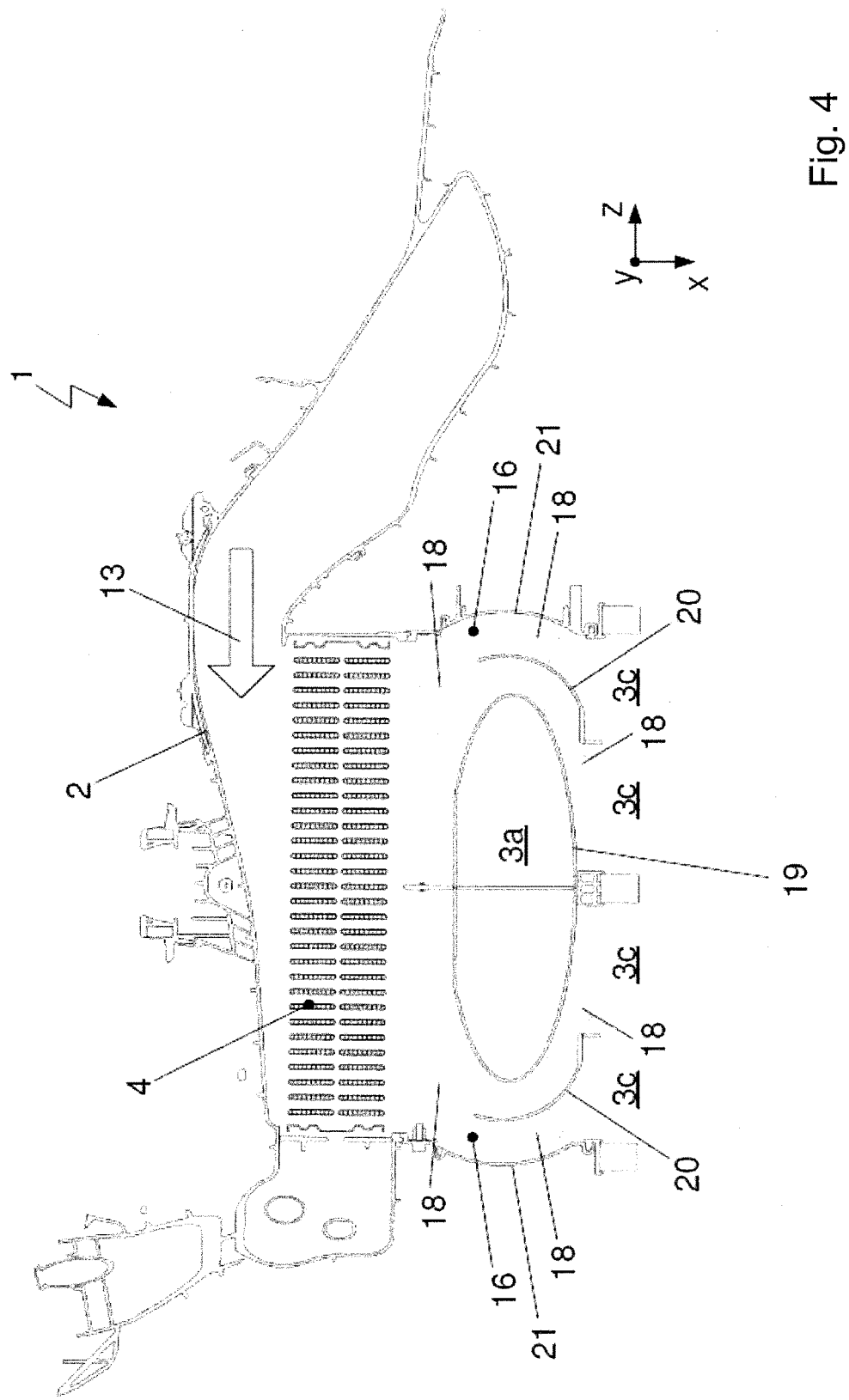
FIG. 4 shows a one-part air outlet to the windshield in a sectional view through a cold air bypass in a top view.

FIGS. 3 and 4 show the air conditioning system 1 of a motor vehicle with a one-part windshield air outlet 3a according to FIG. 3 in the mounted state and according to FIG. 4 in a sectional view through the cold air bypass 16, each in a top view.

In the construction of the one-part windshield air outlet 3a, the cold and dehumidified air branched off in the direction of flow 13, 18 of the air to be conditioned after the evaporator 4 as a bypass air flow flows around the flow conduit 19 of the windshield air outlet 3a. Even the flow conduit 19 integrated in the housing 2 is constructed in one part and has an oval, in particular elliptical cross section of flow for the air to the windshield air outlet 3a. The elliptical shape is a special, closed, oval curve. The term flow conduit 19 constructed in one part denotes that the flow conduit 19 has only one path and is not constructed, as in the prior art according to FIGS. 2a and 2b, from two flow conduits 19' arranged at a distance from one another, and consequently, with two separate paths.

The oval cross section of flow for the air to the windshield air outlet 3a also offers, in addition to the maximum possible cross-sectional surface with a substantially constant wall thickness of the flow conduit 19, a low-flow resistance to the cold air flowing through the cold air bypass 16 around the flow conduit 19.

The cold air bypass 16 is designed to be able to be opened and closed with the bypass air flap 17.

The cold air bypass 16 constructed in a bipartite manner is limited on the one hand by the outside of a wall of the flow conduit 19 and on the other hand by a closure element 21 of the housing 2. The closure elements 21 are constructed as components of the wall of the housing 2, are arranged opposite the in particular elliptical shape of the flow conduit 19, and enclose the housing 2 in the area of the cold air bypass 16.

The closure elements 21 are concavely shaped in the cross section running in the plane stretching from the horizontal direction x and the depth direction z so that the portions of the bypass air flow of the cold air conducted through the two areas of the cold air bypass 16 are conducted in a rheologically advantageous manner around the flow conduit 19.

In addition, air conduction elements 20 are arranged in the area of the cold air bypass 16 extending between the main top surfaces of the in particular elliptical shape of the flow conduit 19 and the oppositely arranged closure elements 21, which air conduction elements 20 conduct the cold air around the flow conduit 19 to the central dashboard air outlets 3c. The air conduction elements 20 are arranged in their cross section substantially parallel to the wall of the flow conduit 19 and are constructed in such a manner that the cold air is also conducted into the area of the secondary top surfaces of the in particular elliptical shape of the flow conduit 19 inside the cold air bypass 16.

The centrally arranged dashboard air outlets 3c are also loaded with sufficiently cold air with the elliptical shape of the wall of the flow conduit 19 and the arrangement of the air conduction elements 20 so that the bypass air flow of cold air flowing through the cold air bypass 16 is uniformly distributed onto the dashboard air outlets 3c. The elliptical or oval shape of the wall of the flow conduit 19 is not only optimal as regards the reduction of the flow resistance inside the cold air bypass 16, but also serves at the same time to minimize the risk of the undesired production of noise.

The air conduction element 20 is advantageously arranged integrated on the closure element 21 so that the air conduction element 20 and the closure element 21 are constructed as a one-piece element. Consequently, the air conduction elements 20 are also brought into the housing 2 of the air conditioning system 1 with the assembly of the closure elements 21 on both sides for closing the wall of the housing 2 in the area of the cold air bypass 16.

In addition, the manufacture and the processing of the housing 2 are facilitated and the manufacturing time minimized with the integrated construction of the air conduction element 20 and of the closure element 21. In addition, a greater flexibility in the designing of the shape of the air conduction elements 20 is achieved if the air conduction elements 20 are not directly constructed in the housing 2.

The closure elements 21 are screwed and/or clipped depending on the type of seal between the closure element 21 and the wall of the housing 2, for example, to the housing 2.

The closure element 21 can be constructed integrated in a holding device of the kinematics of the air flaps of the air conditioning system 1.

The one-part air outlet 3a to the windshield is open and closed with a single air flap 10. The single air flap 10 is adjusted with a single drive.

LIST OF REFERENCE NUMERALS 1, 1' Air conditioning system
2, 2' Housing
3a, 3a Windshield air outlet
3b Foot-area air outlet
3c Dashboard air outlet
4 Evaporator
5 Hot heat exchanger
6 Cold air path
7 Warm air path
8 Mixing chamber
9a Warm-air temperature flap 7
9b Cold-air temperature flap 6
10, 10' Windshield air flap 3a
11 Foot-area air flap 3b
12 Dashboard air flap 3c
13 Direction of airflow
14 Direction of airflow in the cold air path 6
15 Direction of airflow in the warm air path 7
16, 16' Cold air bypass
17 Bypass air flap 16
18, 18' Direction of airflow in the cold air bypass 16
19, 19' Flow conduit to the air outlet windshield 3a
20 Air conduction element
21 Closure element
x Horizontal direction
y Vertical direction
z Depth direction

The invention claimed is:

1. A housing for an air conditioning system including an evaporator and a heater core, the housing comprising:
   a cold air path guiding an air mass flow conducted through the evaporator to a mixing chamber by bypassing the heater core;
   a warm air path guiding the air mass flow conducted through the evaporator to the mixing chamber by passing through the heater core;
   a windshield air outlet in fluid communication with the mixing chamber;
   a windshield air flap disposed intermediate the mixing chamber and the windshield air outlet;
   a dashboard air outlet in fluid communication with the mixing chamber;
   a dashboard air flap disposed intermediate the mixing chamber and the dashboard air outlet;
   a bypass extending from upstream of the cold air path and the warm air path to the dashboard air outlet, the bypass configured to conduct a bypass air flow around the cold air path, the warm air path, and the mixing chamber; and
   a flow conduit providing fluid communication between the mixing chamber and the windshield air outlet, wherein a cold air temperature flap regulating an amount of opening of the cold air path is formed at the cold air path, a warm air temperature flap regulating an amount of opening of the warm air path is formed at the warm air path, a bypass air flap regulating an amount of opening of the bypass is formed at the bypass, the air mass flow conducted through the evaporator is divided by the cold air temperature flap, the warm air temperature flap, and the bypass air flap into a cold air mass flow through the cold air path, a warm air mass flow through the warm air path, and the bypass air flow through the bypass, and wherein the flow conduit is constructed as a unitary part and includes a wall enclosing a circumference thereof, the flow conduit extending through the bypass, the bypass air flow through the bypass divided by the wall of the flow conduit into a first portion of the bypass air flow and a second portion of the bypass air flow, the bypass formed in a bipartite manner adjacent the flow conduit.

2. The housing according to claim 1, wherein the wall of the flow conduit has an oval cross section.

3. The housing according to claim 1, wherein the windshield air outlet is constructed in a unitary part.

4. The housing according to claim 1, further comprising air conduction elements inside the bypass, the air conduction elements configured to conduct the bypass air flow around the wall of the flow conduit, wherein the bypass air flow is uniformly distributed over a cross-section of the bypass in a direction of flow of the bypass air flow around the flow conduit.

5. The housing according to claim 4, wherein the air conduction elements are arranged at a distance from the wall of the flow conduit, and wherein the first portion of the bypass air flow conducted through the bypass flows between the wall of the flow conduit and a first one of the air conduction elements and the second portion of the bypass air flow conducted through the bypass flows between the first one of the air conduction elements and the housing.

6. The housing according to claim 4, wherein the bypass is limited by an outer side of the wall of the flow conduit and an inner side of a wall of the housing, wherein the housing further comprises at least one closure element in an area of the bypass closing an opening formed in the wall of the housing.

7. The housing according to claim 6, wherein the air conduction element and the at least one closure element are integrally formed.

8. The housing according to claim 1, wherein the warm air mass flow conducted through the warm air path has a first temperature and the cold air mass flow conducted through the cold air path has a second temperature.

9. The housing according to claim 1, further comprising at least one foot-area air outlet and at least one associated foot-area air flap, wherein the mixing chamber is in fluid communication with the windshield air outlet, the foot-area air outlet, and the dashboard air outlet.

* * * * *